United States Patent [19]

Taylor

[11] Patent Number: 4,939,907
[45] Date of Patent: Jul. 10, 1990

[54] EVAPORATIVE PRECOOLER AIR-CONDITIONING SYSTEM

[76] Inventor: Marc F. Taylor, 208 Scottsburg St., Bakersfield, Calif. 93312

[21] Appl. No.: 352,192

[22] Filed: May 16, 1989

[51] Int. Cl.$^5$ .............................................. F25D 17/06
[52] U.S. Cl. .......................................... 62/95; 62/305
[58] Field of Search ......... 62/305, 506, 309, DIG. 16, 62/95, 279, 262; 98/34.6

[56] References Cited

U.S. PATENT DOCUMENTS

| Re. 31,360 | 8/1983 | Manno | 62/305 |
|---|---|---|---|
| 2,068,478 | 1/1937 | Bergdoll | 62/305 X |
| 2,076,119 | 4/1937 | Carraway | 62/305 |
| 2,588,189 | 3/1952 | Wilson . | |
| 2,672,024 | 3/1954 | McGrath | 62/305 X |
| 2,729,951 | 1/1956 | Wyckoff et al. | 62/305 |
| 2,778,203 | 1/1957 | Griffith . | |
| 3,099,915 | 8/1963 | Andersson | 62/305 |
| 3,427,005 | 2/1969 | Kaykendall | 62/305 X |
| 3,521,460 | 7/1970 | Knowles | 62/95 |
| 4,204,409 | 5/1980 | Satama | 62/305 X |
| 4,295,518 | 10/1981 | Rannenberg | 62/95 X |
| 4,347,708 | 9/1982 | Buisjager | 62/95 |
| 4,404,814 | 9/1983 | Beasley et al. | 62/305 X |
| 4,615,181 | 10/1986 | Greenwood | 62/305 X |
| 4,685,308 | 8/1987 | Welker et al. | 62/305 X |
| 4,827,733 | 5/1989 | Dinh | 62/305 |

FOREIGN PATENT DOCUMENTS 234250 6/1961 Australia .............................. 62/305

Primary Examiner—Lloyd L. King
Attorney, Agent, or Firm—Jerry T. Kearns

[57] ABSTRACT

An evaporative precooling unit for use with a conventional refrigerant type air-conditioning system having an exteriorly mounted compressor housing including a compressor, a condenser, a side air inlet, a top air outlet and a fan for directing air through the side air inlet and out the top air outlet to cool the compressor and condenser, includes a precooler housing dimensioned to be installed over the side air inlet of the compressor housing. The precooler housing may utilize either water saturated pads or spray nozzles to provide evaporative cooling to the air entering the compressor housing. In an alternative embodiment, a precooler housing having a bottom cooled air outlet dimensioned for registry with the top air outlet of the compressor housing is utilized to supply cooled air to the compressor and condenser upon reversal of the compressor cooling fan blades. The evaporative precooling unit improves the operating efficiency of the refrigerant type air conditioning system and utilizes the existing compressor cooling fan to duct air through the evaporative cooling unit. A pump motor in the precooling unit is connecting for simultaneous operation with the compressor cooling fan to saturate cooling pads or to supply spray nozzles with water supplied from a constant level internal reservoir.

8 Claims, 6 Drawing Sheets

EVAPORATIVE PRECOOLER AIR-CONDITIONING SYSTEM

BACKGROUND OF THE INVENTION

1. Field of the Invention

The present invention relates to air conditioning systems, and more particularly pertains to an improved air-conditioning system which utilizes an evaporative precooler to supply a cooled air flow to the compressor of a refrigerant type air-conditioning system. In conventional refrigerant type central air-conditioning systems, a single unit is installed on top of the roof of a building. This allows for economical installation by the builder, but locates the condenser in an environment exposed to extremely hot temperatures. In the arid south western regions of the United States, the temperature on the building roof is frequently over one hundred degrees F. which causes the air-conditioning system to work extremely hard to effectively cool the inside of the house. This results in an inefficient system. Because of the high summertime temperatures and low winds along with a relatively low humidity, the climate of this region is suited for use with evaporative type cooling units. The conventional form of air-conditioning system utilized in these roof mounted applications are rectangular with condenser coils on two sides. A single condenser fan is mounted on the top of this housing and draws ambient air through both of these condenser coil sections and exhausts upwardly through a single circular top opening. The condenser precooler system of the present invention consists of mounting an evaporative precooler over the compressor housing air inlets, or mounting a small down draft evaporative cooler, minus the standard screw cage centrifugal fan and motor, to the top of the refrigerant type AC unit and ducting the cooled air outlet opening into the exhaust opening of the existing condenser fan location. The existing condenser fan is modified by turning over the fan blade so that it pulls the air down through the exhaust hole instead of pushing it out. When the thermostat within the building activates the compressor and condenser fan motors to turn on the same two hundred and thirty volt power that runs the condenser fan will also run a two hundred and thirty volt circulating pump to pump the water from a reservoir over the evaporative cooling pads so that the condenser fan then pushes cooled air pass the condenser coils instead of hot ambient air. This system is extremely simple, and may easily be retrofitted onto existing units. The existing control system does not have to be altered in any way for this precooler system, along with the fact that the existing motor and fan can be used. The major cost involved with a standard evaporative cooler is the motor and screw cage blower assembly. By utilizing the existing condenser cooling fan, these costs are eliminated. A standard quarter inch water line is tapped off an outside valve as in conventional evaporative coolers and is connected to an automatic level float valve arrangement which maintains a water supply reservoir at a constant level.

2. Description of the Prior Art

Various types of air conditioning systems are known in the prior art. A typical example of such an air-conditioning system is to be found in U.S. Pat. No. 2,588,189, which issued to B. Wilson on March 4, 1952. This patent discloses an apparatus for precooling a shipping compartment, such as refrigerator car by circulating chilled fluid in a definite predetermined path and periodically reversing the flow of the fluid through the load. U.S. Pat. No. 2,778,203, which issued to W. Griffith on January 22, 1957, discloses an air-conditioning system having a cooling tower for cooling a condenser through evaporative cooling. U.S. Pat. No. 3,521,460, which issued to J. Knowles on July 21, 1970, discloses a two stage air cooling system which involves precooling the outside air supply entering the building at a central location and then further cooling the precooled air at various local stations corresponding to various parts of the interior of the building as the air is distributed. Chilled water is used as the cooling medium and heat is transferred to the cooler at the local cooling stations first. U.S. Pat. No. 4,295,518, which issued to G. Rannenberg on October 20, 1981, discloses a combined air cycle heat pump and refrigeration system utilizing air as a refrigerant. A turbo compressor and a regenerative heat exchanger are used for both cooling in the refrigeration mode and heating in the heat pump mode. A plurality of valves are arranged so that in the refrigeration mode the refrigerant air operates in a closed dry loop to avoid problems associated with moisture. U.S. Pat. No. 4,347,708, which issued to R. Bussjager on September 7, 1982, a makeup air preconditioner for use with an air-conditioning unit. An add-on preconditioning unit includes a separate vapor compression refrigeration unit for heating or cooling makeup air supply to an air-conditioning system.

While the above mentioned devices are directed to air conditioning systems, none of these devices disclose an evaporative precooling unit for retrofitting on a conventional refrigerant type exteriorly mounted air-conditioning system unit for supplying precooled air to cool the compressor and condenser unit. Inasmuch as the art is relatively crowded with respect to these various types of air conditioning systems, it can be appreciated that there is a continuing need for and interest in improvements to such air conditioning systems, and in this respect, the present invention addresses this need and interest.

SUMMARY OF THE INVENTION

In view of the foregoing disadvantages inherent in the known types of air conditioning systems now present in the prior art, the present invention provides an improved evaporative precooler air-conditioning system. As such, the general purpose of the present invention, which will be described subsequently in greater detail, is to provide a new and improved evaporative precooler air-conditioning system which has all the advantages of the prior art air conditioning systems and none of the disadvantages.

To attain this, a representative embodiment of the concepts of the present invention is illustrated in the drawings and makes use of an evaporative precooling unit for use with a conventional refrigerant type air-conditioning system having an exteriorly mounted compressor housing including a compressor, a condenser, a side air inlet, a top air outlet and a fan for directing air through the side air inlet and out the top air outlet to cool the compressor and condenser. The invention includes a precooler housing dimensioned to be installed over the side air inlet of the compressor housing. The precooler housing may utilize either water saturated pads or spray nozzles to provide evaporative cooling to the air entering the compressor housing. In an alternative embodiment, a precooler housing having a bottom cooled air outlet dimensioned for registry with the top air outlet of the compressor housing is utilized to supply cooled air to the compressor and condenser upon reversal of the compressor cooling fan blades. The evaporative precooling unit improves the operating efficiency of the refrigerant type air conditioning system and utilizes the existing compressor cooling fan to duct air through the evaporative cooling unit. A pump motor in the precooling unit is connecting for simultaneous operation with the compressor cooling fan to saturate cooling pads or to supply spray nozzles with water supplied from a constant level internal reservoir.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved evaporative precooler air-conditioning system which has all the advantages of the prior art air conditioning systems and none of the disadvantages.

It is another object of the present invention to provide a new and improved evaporative precooler air-conditioning system which may be easily and efficiently manufactured and marketed.

It is a further object of the present invention to provide a new and improved evaporative precooler air-conditioning system which is of a durable and reliable construction.

An even further object of the present invention is to provide a new and improved evaporative precooler air-conditioning system which is susceptible of a low cost of manufacture with regard to both materials and labor, and which accordingly is then susceptible of low prices of sale to the consuming public, thereby making such air conditioning systems economically available to the buying public.

Still yet another object of the present invention is to provide a new and improved evaporative precooler air-conditioning system which provides in the apparatuses and methods of the prior art some of the advantages thereof, while simultaneously overcoming some of the disadvantages normally associated therewith.

Still another object of the present invention is to provide a new and improved evaporative precooler air-conditioning system which may be easily retrofitted to an existing refrigerant type air-conditioning unit to supply precooled air to the compressor and condenser.

Yet another object of the present invention is to provide a new and improved evaporative precooler for a refrigerant type air-conditioning system which utilize the existing compressor cooling fan for ducting air through the evaporative cooling unit.

Even still another object of the present invention is to provide a new and improved evaporative cooling unit for improving the operating efficiency of a refrigerant type air-conditioning system without increasing the humidity within an air-conditioned building.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
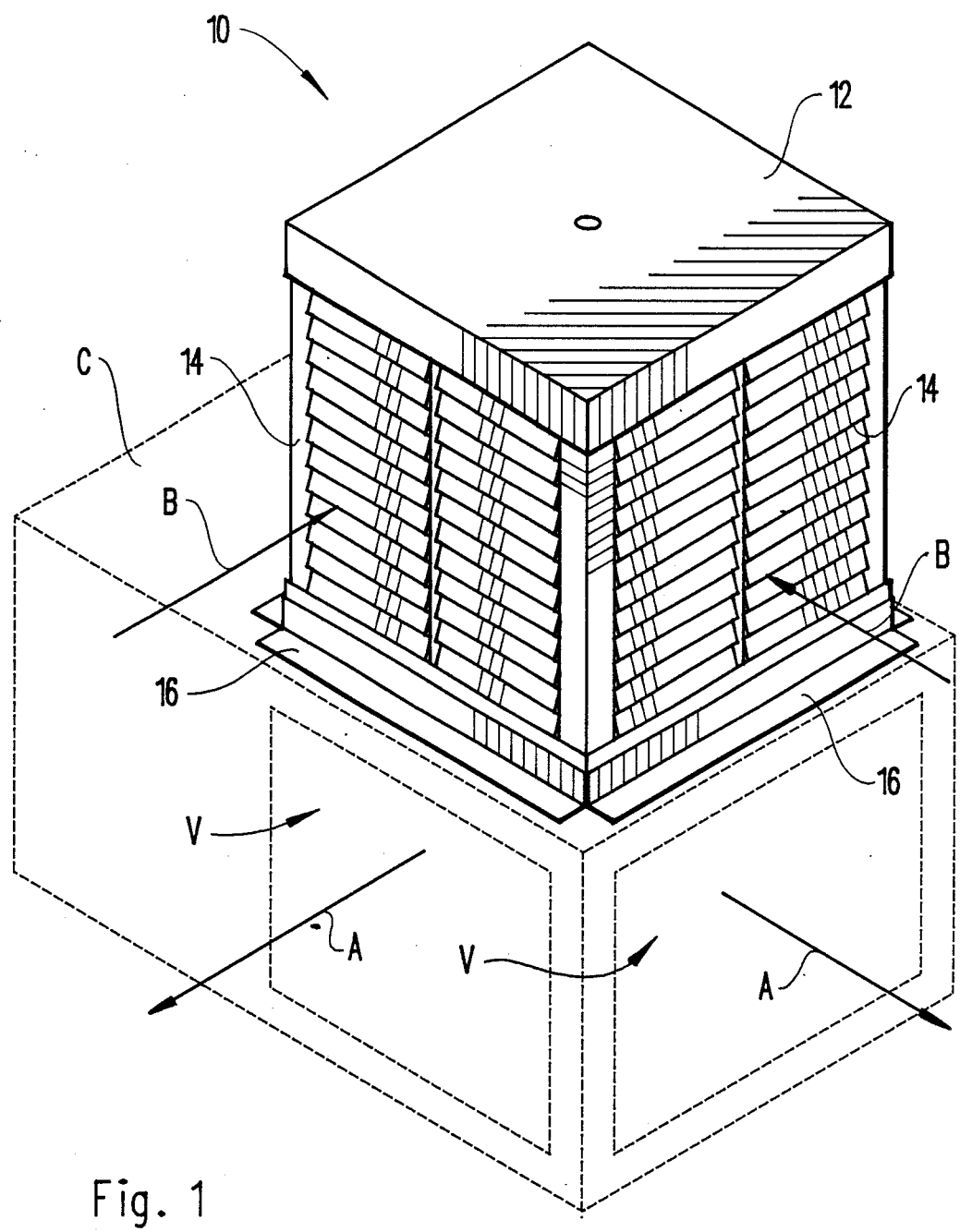
FIG. 1 is a perspective view illustrating the evaporative precooling unit mounted on the top surface of a conventional exteriorly mounted refrigerant type air-conditioner housing.

With reference now to the drawings, and in particular to FIG. 1 thereof, a new and improved evaporative precooler air-conditioning system embodying the principles and concepts of the present invention and generally designated by the reference numeral 10 will be described.

More specifically, it will be noted that the first embodiment 10 of the invention includes a generally rectangular housing 12 having a plurality of inlet apertures 14 disposed on four side walls thereof. Mounting flanges 16 are provided at a bottom end on each side wall of the housing 12 for securing the housing 12 on the top surface of a typical refrigerant type exteriorly mounted compressor and condenser air-conditioning housing C. The air-conditioning unit C typically includes a pair of inlet vents V and a circular top air outlet. In use, the cooling fan within the unit C conventionally draws ambient air through the vents V as indicated by arrows B, through the condenser coils and out through the top outlet opening to cool the condenser and compressor. The precooling unit 12 of the present invention has a bottom circular cooled air outlet disposed in registry with the air outlet of the air-conditioning unit C. Before installation of the precooler 12, the cooling fan within the unit C is reversed such that ambient air will be inducted inwardly through the apertures 14 and cooled through evaporative action within the unit 12 and then ducted through the compressor and condenser coils within the unit C and out the vents V as indicated by arrows A.

Figure 2:
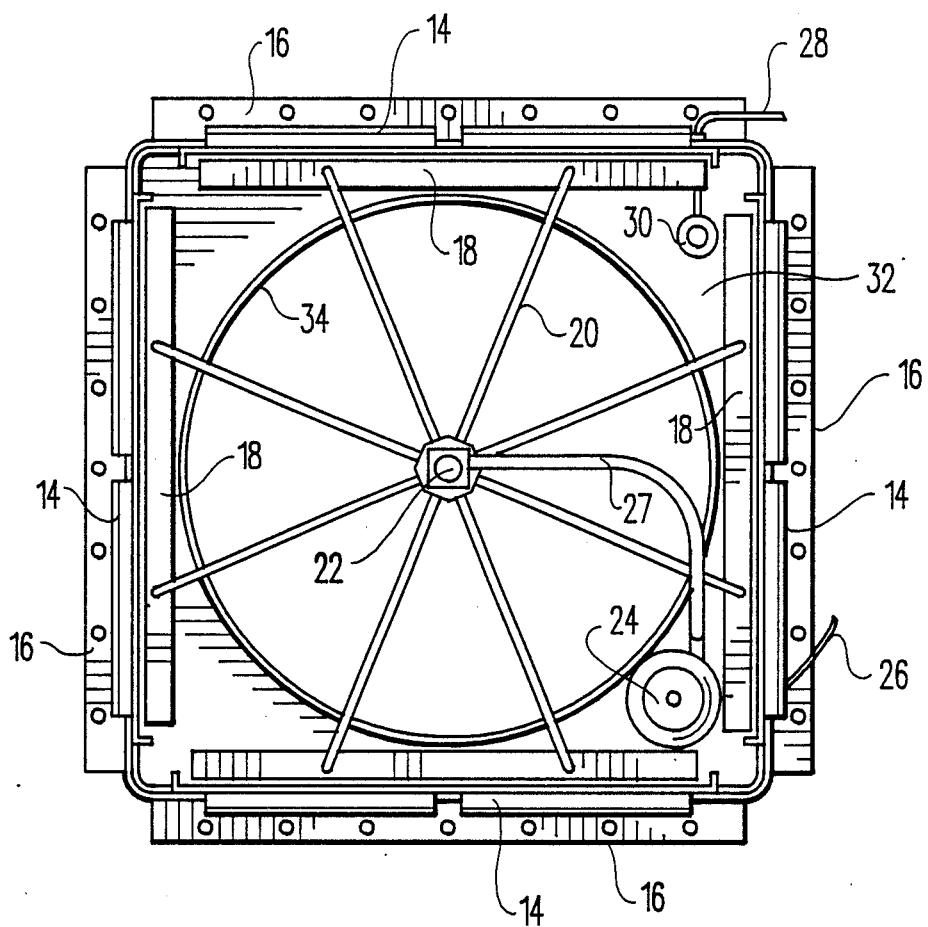
FIG. 2 is a top view of the evaporative precooling unit, with the top housing cover removed.

FIG. 2 illustrates a top plan view with the top cover removed. The cooled air outlet 34 includes an upstanding cylindrical side wall which forms a water reservoir 32 in the bottom portion of the unit. A water supply line 28 is connected to an external water source and is controlled by a float type valve 30 which maintains a constant level in the supply reservoir 32. A pump 24 has an intake within the reservoir 32 and an outlet 27 connected to a manifold 22 which distributes water to nozzle bodies 18 situated above evaporative cooling pads which overlie the vent apertures 14 formed in each of the four side walls of the housing. A power supply line 26 for the pump 24 is connected for simultaneous activation of the pump 24 with the compressor and cooling fan within the existing refrigerant type air-conditioning unit. Thus, the expense of a motor and fan in the evaporative cooling unit is eliminated by utilizing the existing fan within the refrigerant type air conditioning unit.

Figure 3:
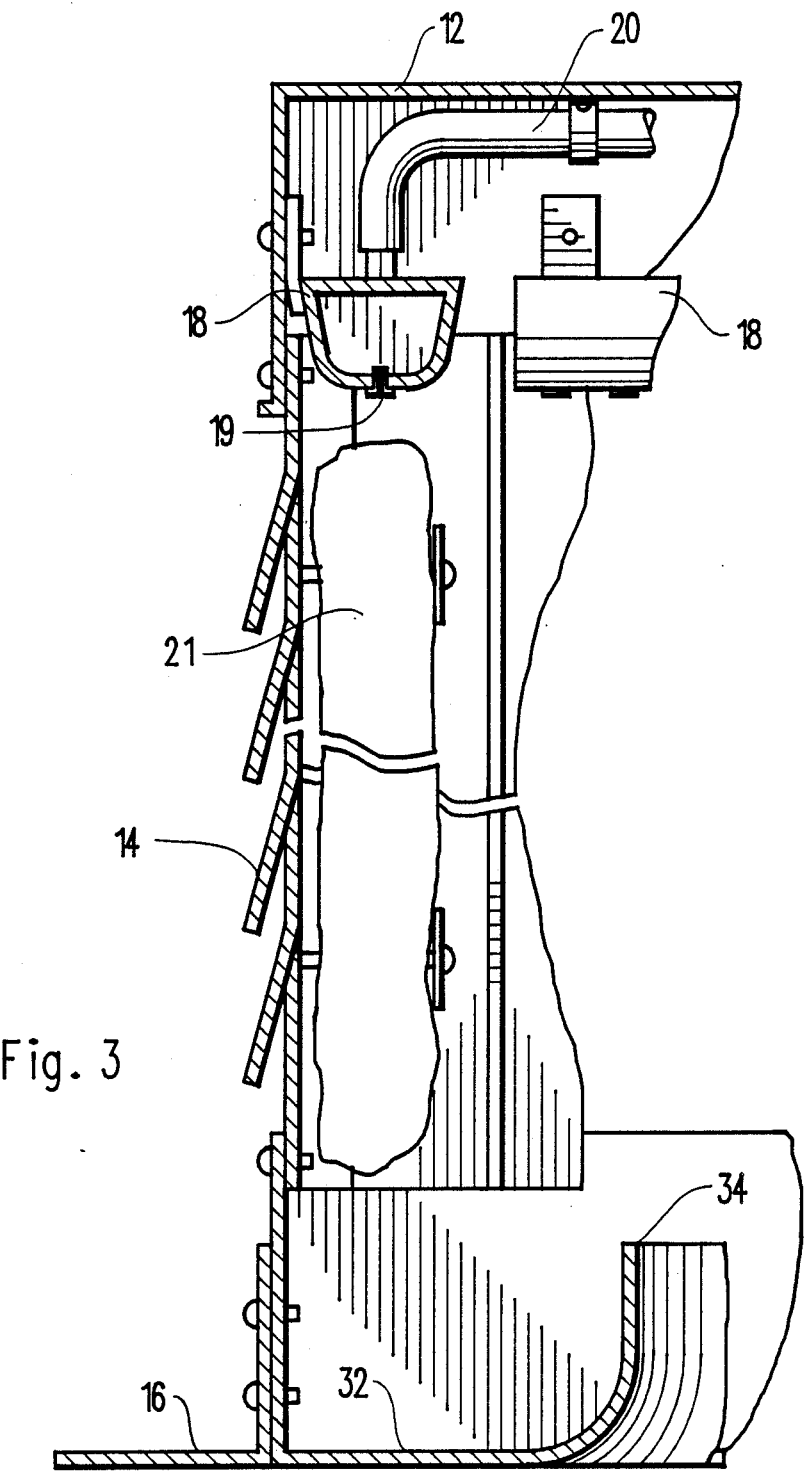
FIG. 3 is a cross sectional detail view, partially cut away, illustrating the interior construction of the evaporative precooling unit.

FIG. 3 is a cross sectional detail view which illustrates the open weave evaporative cooling pad 21 secured overlying the ambient air inlet apertures 14. The cooled air outlet 34 includes a cylindrical wall which extends upwardly, forming the water reservoir 32. The nozzle body 18 includes a plurality of spray nozzles 19 for directing water to saturate the evaporative pad 21.

Figure 4:
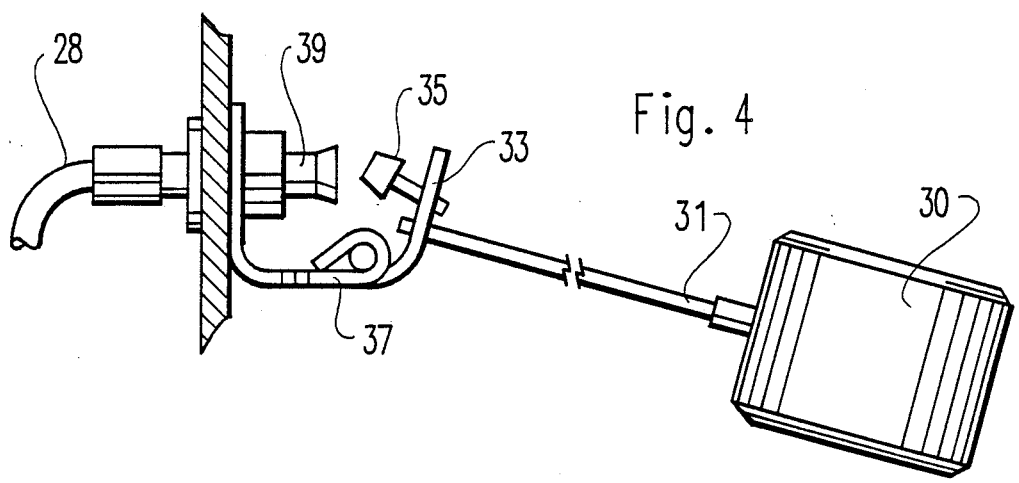
FIG. 4 is a detail view illustrating a float type valve utilized to maintain a constant water reservoir level.

FIG. 4 is a detail view illustrating the float water level control valve which includes a float 30 connected by a stem 31 to a pivotal bracket 33. A plug 35 on the pivotal bracket 33 engages a seat 39 formed in the water supply 28. The bracket 33 is pivotally mounted on a stationary bracket 37. When the float 30 moves upwardly as the water level within the reservoir increases, the plug 35 will engage the seat 39, thus shutting off the water supply line 28.

Figure 5:
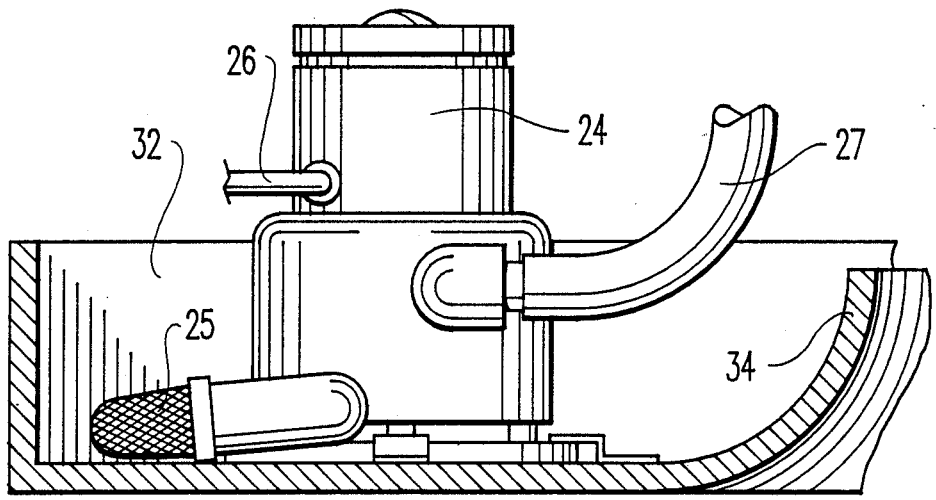
FIG. 5 is a detail view, illustrating the pump for supplying water from the reservoir to evaporative cooling pads of the precooling unit.

FIG. 5 illustrates a detail view depicting the pump 24 which includes an intake 25 disposed in the reservoir 32 and having an outlet 27 for distributing water to evaporative cooling pads.

Figure 6:
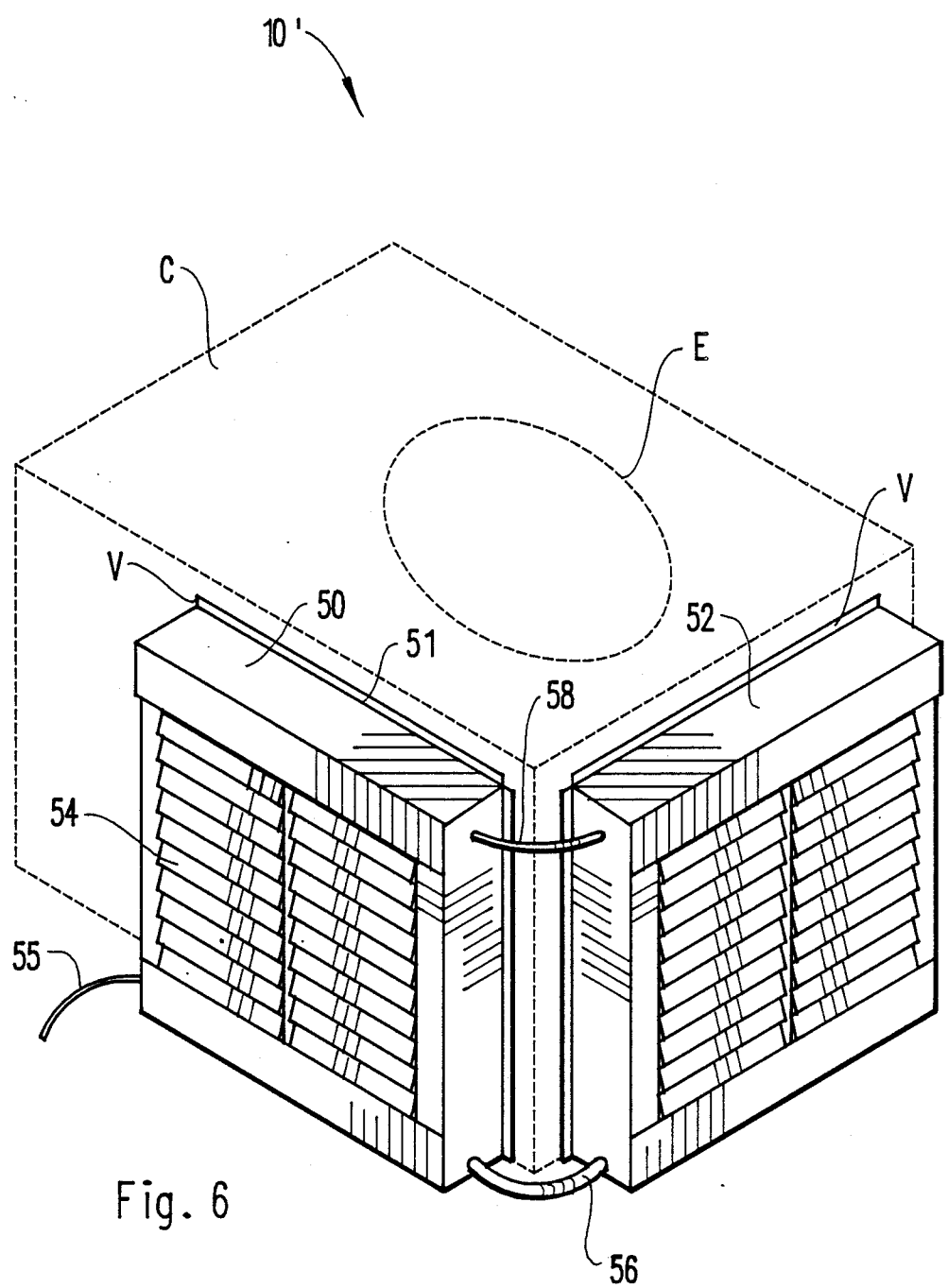
FIG. 6 is a perspective view illustrating a precooler according to a second embodiment of the invention.

FIG. 6 illustrates a second embodiment 10' of the invention which is installed on the side cooling air inlet vents V of a conventional compressor/condenser housing C. The advantage of this arrangement is that the compressor cooling blade need not be reversed, and the exhaust vent E remains unobstructed. The precooler 10' includes a pair of evaporative cooling housings 50 and 52, constructed as rectangular frames, and preferably formed from a corrosion resistant material such as PVC or fiberglass. While two of the units 50 and 52 are illustrated, it should be noted that a greater or lesser number may be employed without departing from the scope of the invention. Each of the frames 50 and 52 include front air inlets 54, protected by inclined vent slats. A water supply line 55 is connected to an external water supply and supplies cooling water to an internal float valve controlled constant level reservoir within the bottom portion of the frame 50. An equalizer drain line 56 connects the reservoir in the frame 50 with a similar reservoir in the frame 52. A water supply line 58 feeds water from a feed pump in the frame 50 through a manifold to supply evaporative cooling water to the frame 52. The frames 50 and 52 each include mounting flanges 51 to enable extremely quick installation to the existing compressor/condenser housing C.

Figure 7:
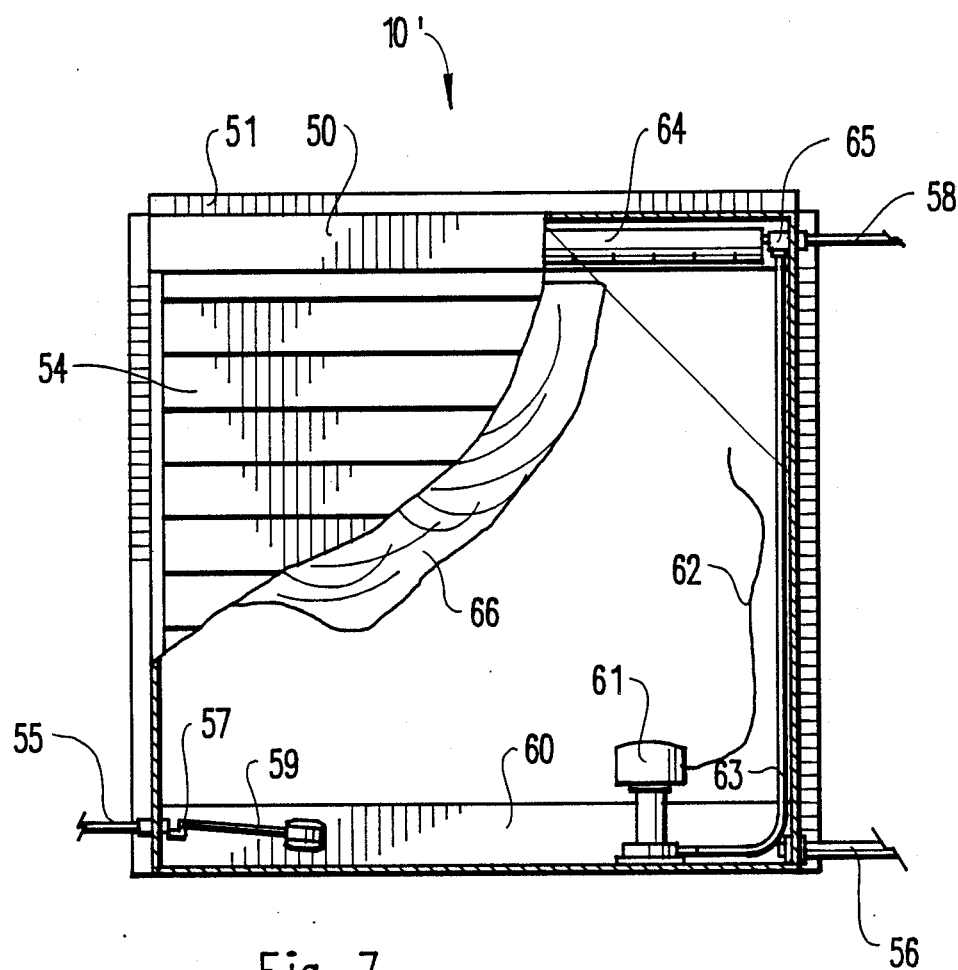
FIG. 7 is a front view, partially cut-away, illustrating the precooler of FIG. 6.
Figure 8:
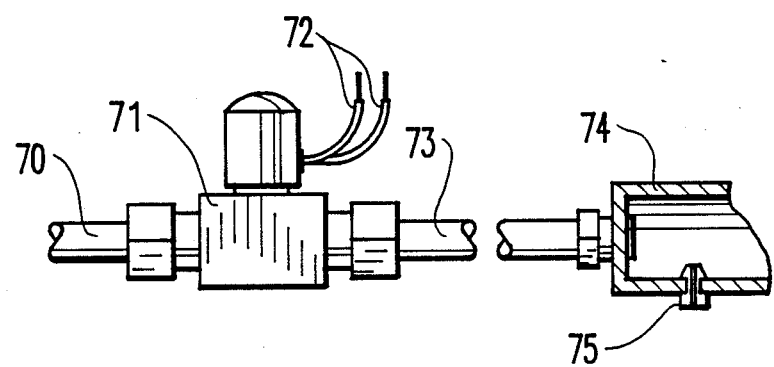
FIG. 8 is a detail view illustrating a precooler spray nozzle system.

FIG. 7 is a front cut away view which further illustrates the construction of the precooler frame 50. Water from the supply line 55 enters the reservoir 60 through a valve 57 controlled by a float 59. A feed pump 61 has an intake located in the reservoir 60 and has control leads 62 connected to the actuating relay of the compressor of the air conditioning unit. An outlet line 63 from the pump 61 feeds a distribution trough which saturates a porous fiber mat 66. Thus, when the compressor is actuated, the feed pump 61 simultaneously saturates the pad 66, and cooling air is drawn into the compressor/condenser housing through the vents 54 and the saturated pad 66. This provides an evaporative precooling which enhances the efficiency of the air conditioning system. The frame 52 may be fed from the feed pump 61 through a manifold 65 and supply line 58, thus avoiding the expense of duplicate pumps and float valves.

As shown in FIG. 7, a spray manifold trough 74 may be utilized in place of the distribution trough 64 and the mat 66. The spray manifold 74 includes a plurality of spaced nozzles 75 which produce a fine spray mist through which the incoming cooling air from the vent 54 must pass before traveling to the compressor housing. The flow rate of incoming cooling water from the line 70 is controlled by a 24 Volt AC coil operated valve 71 which has control leads 72 connected to the compressor actuation relay. Thus, the spray cooling is active only when the compressor has been activated by a thermostat located within the building to be cooled. The water is cooled through expansion when passing through the nozzles 75, just before contacting the incoming cooling air.

Based on historical weather data, in Bakersfield California, the precooler yields about an 85-90% cooling efficiency of the ambient air going through the precooler unit to the contents of coils. This means an 85-90% of the difference between the dry bulb temperature and the wet bulb temperature. This cooling effect means that the air supply to the condenser coils is much cooler than the normal ambient air used in conventional roof mounted air-conditioning units. As much as a twenty-five to thirty degree F temperature different will be achieved depending upon the ambient temperature and humidity. This results in much better heat transfer and reduces electrical demand and allows a shorter running time to effect the same amount of heat transfer from the inside of the house to the outside. Measured Kw demand reductions between 15% and 20% have been achieved along with similar reductions in running times between on and off cycles of the compressor, depending upon the dry bulb temperature at the time of the measurement. It is estimated that this unit will reduced summer cooling cost for a 1500 square foot house by $150 to $200 from May to October. A short squat air precooler package consisting of standard evaporative cooling mats and a conventional circulating pump in an enclosure could be made very cheaply due to the omission of the blower and motor. The device may be retrofitted to existing air-conditioning units or may be originally manufactured therewith. The precooler of the present invention requires an extremely simple control and power system utilizing only two wires for controlling the on and off cycle of the evaporative cooling unit pump when the air-conditioning unit compressor is turned on and off by the existing thermostat. The water usage rate in the evaporative cooling unit is automatically controlled through conventional evaporative cooler designs. The use of an evaporative mat to act as a mist eliminator and contact surface for the air and water causes water minerals to be deposited on the mat instead of in the condenser coils. The mat can be easily and inexpensively replaced when it does become clogged for any reason. It is estimated that the evaporative mats should last for a single year and may be easily replaced annually at scheduled maintenance intervals. The precooler unit of the present invention is completely external to an existing air-conditioning unit and can be installed in about an hour by one person. The use of an evaporative precooler with a conventional refrigerant type air-conditioning system does not cause an increase in humidity levels to the inside of a house during constant use. Many people refuse to use conventional evaporative coolers for primary air-conditioning for this reason, because the elevated humidity levels can cause mold and mildew to grow in air-conditioning ducts which causes allergies in some people.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of improving the operating efficiency of a refrigerant type air-conditioning system having an exteriorly mounted compressor housing including a compressor, a condenser, a side air inlet, a top air outlet and a fan for directing air through said side air inlet and out said top air outlet, comprising the steps of:
   providing an evaporative cooling unit including a housing having a bottom cooled air outlet dimensioned for registry with said top air outlet of said compressor housing;
   reversing the fan blades of said compressor cooling fan;
   securing said evaporative cooling unit housing on a top surface of said compressor housing with said cooled air outlet in registry with said air outlet of said compressor housing; and
   connecting said evaporative cooling unit for simultaneous operation with said compressor cooling fan to provide a reversed cooled air flow through said compressor housing.

2. For use with a refrigerant type air-conditioning system having an exteriorly mounted compressor housing including a compressor, a condenser, a side air inlet, a top air outlet and a compresser/condenser cooling fan for directing air through said side air inlet and out said top air outlet to cool said compressor and condenser, the improvement comprising:
   an evaporative cooling unit including a housing having a bottom cooled air outlet dimensioned for registry with said air outlet of said compressor housing; and
   means for reversing said compressor/condenser cooling fan blades so as to supply cooled air from said evaporative cooling unit to the compressor and condenser.

3. The evaporative precooler air-conditioning system of claim 2, further comprising a plurality of flanges on a bottom end of said evaporative cooling unit housing for securement to a top surface of said compressor housing.

4. The evaporative precooler air-conditioning system of claim 2, further comprising a plurality of air inlet apertures formed in side wall surfaces of said evaporative cooling unit housing.

5. The evaporative precooler air-conditioning system of claim 4, further comprising a plurality of evaporative pads overlying said air inlet apertures.

6. The evaporative precooler air-conditioning system of claim 5, further compressor a water reservoir in a bottom portion of said evaporative cooling unit housing and a pump in said reservoir for saturating said pads.

7. The evaporative precooler air-conditioning system of claim 6, further comprising an external water supply line communicating with said reservoir and a float valve to maintain a constant water level in said reservoir.

8. The evaporative precooler air-conditioning system of claim 2, wherein said evaporative cooling unit housing is rectangular, said air inlet apertures are provided on four side walls of said evaporative cooling unit housing and said cooled air outlet comprises a central circular aperture dimensioned for registry with a standard compressor housing top air outlet.

* * * * *